MULTI-STATE SWITCHING SYSTEMS

Filed Oct. 7, 1958 3 Sheets-Sheet 1

INVENTORS
LUBOMYR S. ONYSHKEVYCH &
WALTER F. KOSONOCKY
BY
Morris Rabkin
ATTORNEY

INVENTORS
LUBOMYR S. ONYSHKEVYCH &
WALTER F. KOSONOCKY

BY Morris Rabkin

ATTORNEY

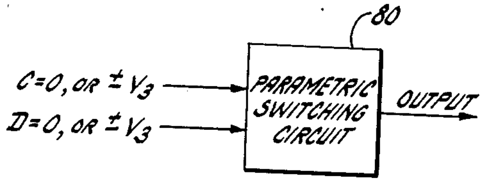
Fig. 8.
| D \ C | -1 | 0 | +1 |
|---|---|---|---|
| -1 | -1 | -1 | 0 |
| 0 | -1 | 0 | +1 |
| +1 | 0 | +1 | +1 |
Fig. 9.
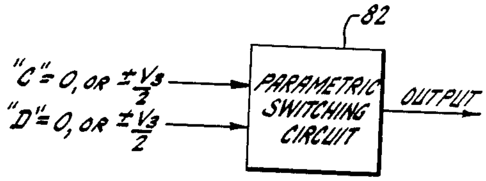
Fig. 10.
| D \ C | -1 | 0 | +1 |
|---|---|---|---|
| -1 | -1 | 0 | 0 |
| 0 | 0 | 0 | 0 |
| +1 | 0 | 0 | +1 |
Fig. 11.
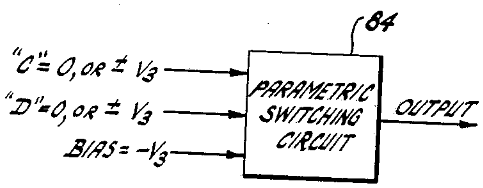
Fig. 12.
| D \ C | -1 | 0 | +1 |
|---|---|---|---|
| -1 | -1 | -1 | -1 |
| 0 | -1 | -1 | 0 |
| +1 | -1 | 0 | +1 |
Fig. 13.
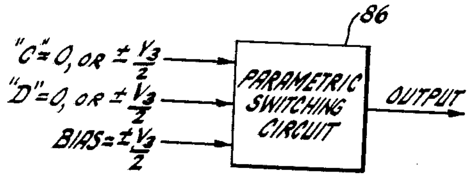
Fig. 14.
| D \ C | -1 | 0 | +1 |
|---|---|---|---|
| -1 | -1 | -1 | 0 |
| 0 | -1 | 0 | 0 |
| +1 | 0 | 0 | 0 |
Fig. 15.
INVENTORS
LUBOMYR S. ONYSHKEVYCH &
WALTER F. KOSONOCKY
BY Morris A. Rabkin
ATTORNEY United States Patent Office 3,056,039

Patented Sept. 25, 1962

3,056,039
MULTI-STATE SWITCHING SYSTEMS

Lubomyr S. Onyshkevych, Princeton, and Walter F. Kosonocky, Newark, N.J., assignors to Radio Corporation of America, a corporation of Delaware Filed Oct. 7, 1958, Ser. No. 765,838
9 Claims. (Cl. 307—88)

This invention relates to switching systems, and particularly to switching systems using multi-state logic circuits.

Switching systems involve the interconnection of a plurality of multi-state elements to perform a logical operation on two or more input signals. The most commonly used element is a two-state element, such as a magnetic core, a flip-flop circuit, or an electronic gating circuit. In switching systems using two-state elements, the switching function can be expressed in a two-state logical algebra called Boolean algebra. Other multi-state logical algebras are known, for example, a three-state algebra called Post algebra. Most three-state logical circuits are relatively complex or are marginal in operation and, therefore, are seldom used. One problem with prior art three-state logic circuits is that the output signals corresponding to the three stable states are not sufficiently distinct; another problem is that the margin of response to different combinations of input signals is too narrow for reliable operation.

It is an object of the present invention to provide improved three-state logic circuits.

Another object of the present invention is to provide improved switching systems using multi-state logic circuits.

Still another object of the present invention is to provide improved switching systems using three-state logic circuits which are relatively simple in construction and reliable in operation.

According to the present invention, a parametric oscillator circuit is used as a three-state logic circuit. The circuit is operated to provide three distinct outputs each controlled by a different combination of input signals. The circuit exhibits a wide margin of response to the different combinations of input signals. One output is represented by oscillations of one phase, another by oscillations in the phase opposite the one phase, and the third output is represented by the absence of oscillations.

A feature of the invention involves the use of the parametric oscillator circuits to obtain directivity of information flow in a switching system using a single A.C. supply source.

In the accompanying drawings:

FIGS. 8 through 16 are each block diagrams of different multi-state logical system according to the present invention.

Figure 1:
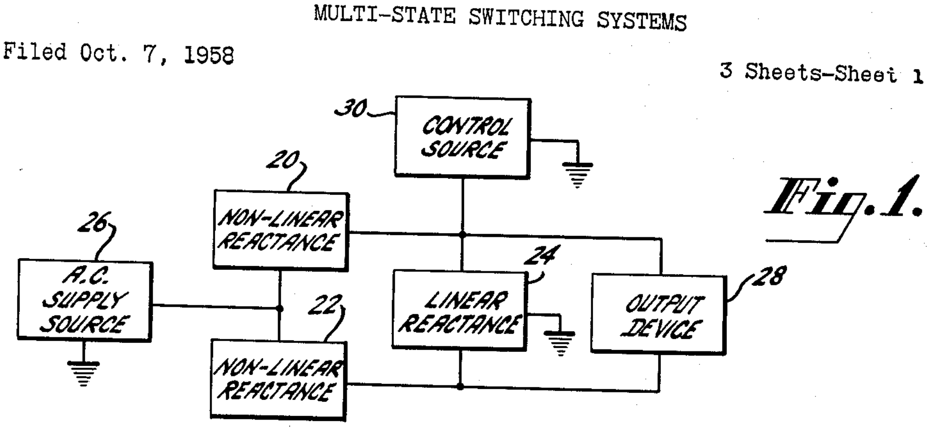
FIG. 1 is a generalized block diagram of a parametric oscillator circuit useful in the present invention.

A parametric oscillator system includes a non-linear reactance element connected with a linear reactance in a tuned circuit. Frequently, a pair of non-linear reactances, such as the non-linear reactances 20 and 22 of FIG. 1 are connected in a balanced circuit arrangement to the linear reactance 24. The balanced arrangement operates to prevent the supply frequency of an A.C. (alternating current) supply source 26 from reaching an output device 28. The circuits are tuned to resonate at a multiple of the supply frequency. The present circuits are tuned to the second sub-harmonic (the frequency $f$) of the supply frequency ($2f$) because the energy conversion between the supply and output is relatively high at the second sub-harmonic frequency. Also, as described more fully hereinafter, the tristable operating region is most pronounced at the second sub-harmonic frequency. Other multiples of the supply may be chosen if necessary, or desired. The output device 28 may be any suitable device such as a phase discriminating circuit, another parametric oscillator circuit, and so on.

The phases in which the oscillations occur are controlled by signals supplied by a control source 30. The oscillations "lock" into the phase of the control signals. After the oscillations are locked in the desired phase, the control signals can be removed and the phase of the oscillations remains unaltered. Two phases are of interest in the present invention. These two phases are mutually opposite each other, and hereinafter are designated the "A" signal and the "B" signal. Assuming a standard control signal of frequency ($f$), the "A" signal is in phase with the standard signal, and the "B" signal is 180° out of phase with the standard signal. The "A" and "B" signals, then correspond to two separate information signals. The control source 30 is used to set the oscillator to either one of the phases corresponding to the "A" and "B" signals.

Figure 2:
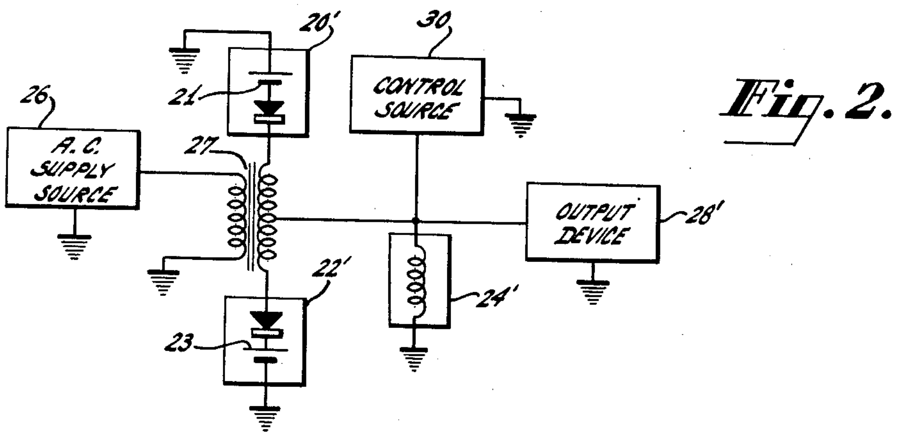
FIG. 2 is a schematic diagram of a parametric circuit using variable capacity diodes.

In FIG. 2, the non-linear reactances are provided by a pair of variable capacity crystal diodes 20′ and 22′. The diodes 20′ and 22′ exhibit a non-linear capacity when biased in the reverse direction by any suitable bias source, such as the batteries 21 and 23. Suitable crystal diodes are junction diodes of type 1N93 which are relatively cheap and are readily available. Other variable capacity diodes such as point contact diodes may be used. The variable capacity reactance elements can be provided by other known devices such as the grid-cathode capacitance of a pentode type vacuum tube, by condensers having dielectrics of ferroelectric material, and so on. A linear inductance element 24′ provides the linear reactance. A transformer 27 couples the A.C. supply source 26 to the parametric circuits. The primary winding of the transformer 27 is connected to the supply source 26. The secondary winding of the transformer 27 has a center-tap connected to the ungrounded end terminal of the inductance 24′. The end terminals of the secondary winding are connected to the cathode and anode respectively of the diodes 20′ and 22′ to provide a pair of balanced tuned circuits. The control source 30 and the output device 28′ are each connected to the ungrounded end terminal of the inductance 24′.

Figure 3:
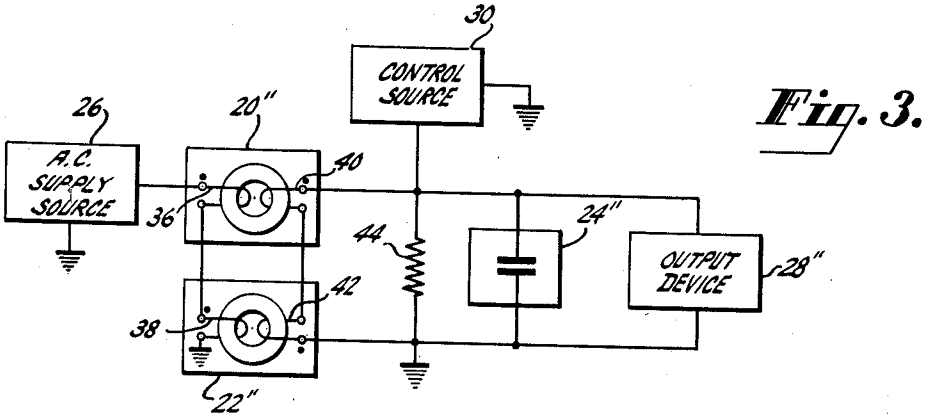
FIG. 3 is a schematic diagram of a parametric circuit using ferromagnetic cores.

In FIG. 3, the non-linear reactances are provided by a pair of cores 20″ and 22″ of ferromagnetic material. A suitable magnetic material is one exhibiting a rectangular hysteresis characteristic. The A.C. supply source 26 is coupled to the cores 20″ and 22″ by a pair of supply windings 36 and 38 linked in the same one sense to the cores 20″ and 22″ respectively. The cores 20″ and 22″ are biased to a suitable point on their characteristic by any suitable bias means, not shown. The linear reactance is provided by a linear capacitor 24″ coupled to a pair of output windings 40 and 42 of the cores 20″ and 22″, respectively. The output windings 40, 42 are linked in mutually opposite senses to the cores 20″, 22″. Control signals are supplied to the oscillator circuits via a resistance element 44 connected across the capacitor 24″.

Each of the parametric oscillator circuits effectively is a two terminal device, hence the response of each oscillator circuit is symmetrical with respect to signals appearing at the input and output terminals. Thus, the input and output terminals can be interchanged with each other in each of the circuits of FIGS. 1, 2, and 3 without changing the circuit operation. Also, the principle of superposition applies, and a plurality of separate input signals may be coupled to the same input point, with the resulting net input signal controlling the circuit operation.

In operation, the parametric oscillator circuit exhibits three distinct regions of response to increasing A.C. supply voltage from the A.C. source 26. These three regions of the parametric circuit of FIG. 2 are indicated by the response characteristic 50 of FIG. 4. The curve 50 is a plot of the output voltage amplitude at frequency ($f$) vs. the supply voltage amplitude for a given tuning and given supply frequency. In region I, between the points $o$ and $a$, the circuit does not oscillate. Substantially no output voltage is produced because the sub-harmonic frequency ($f$) is not generated, and because the circuits are assumed to be perfectly balanced, the supply frequency ($2f$) completely cancels in the output circuit. In region II, between the points $c$ and $d$ of the supply voltage, the circuit is always oscillating, and further may be oscillating in either one or the other of the two phases.

Region III of the curve 60 is a tristable region. That is, the circuit may be (1) not oscillating, (2) oscillating in one phase, or (3) oscillating in the opposite phase. In the prior art, the region II is treated as a transition region, and the circuit operation is carried out in either region I or region II. The desired phase in which the circuit oscillates is controlled by whether an "A" phase control signal or a "B" phase control signal was applied during the build-up of the oscillations. In the prior art, the control signal is applied prior to the application of the supply signals. The later applied supply signals then cause the circuit to oscillate in the desired phase. The control signals then may be removed and the circuit continues to operate in a desired phase so long as the supply signals are present.

Figure 5:
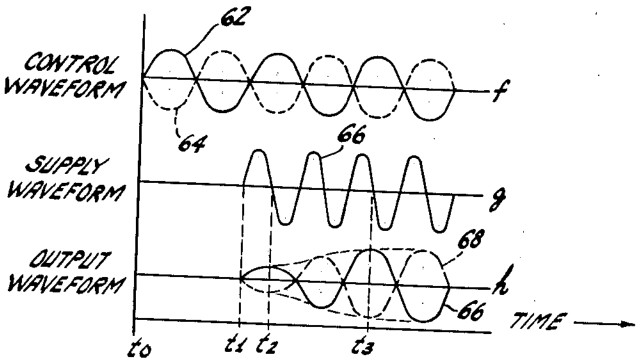
FIG. 5 is a timing diagram of waveforms useful in explaining the operation of the circuits of the present invention.

The operation of a parametric oscillator circuit is indicated by the waveforms of FIG. 5. In line $f$ the solid and dotted waveforms 62 and 64 respectively represent the "A" and the "B" phase control signals. The waveform 66 of line $g$ represents the supply signals, and the solid and dotted waveforms 66 and 68 of line $h$ represent the output waveforms corresponding to the "A" and "B" phase control signals, respectively. From the curves of FIG. 5, it is seen that between the times $t0$ and $t1$, prior to the application of the supply signals, the circuit is not oscillating and no, or at most relatively small amplitude output signals, due to transformer coupling of the control signals, are produced. Between the times $t1$ and $t2$, after the supply signal is applied, the oscillations begin to "build-up" in amplitude until a maximum amplitude is reached at a later time $t3$. Thereafter, the circuit oscillates at the maximum amplitude. The control signals may be removed at any time between the times $t1$ and $t3$ after the oscillations have started to "build-up."

Figure 4:
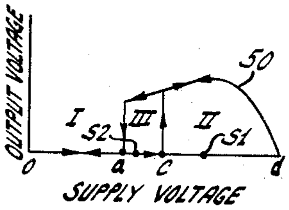
FIG. 4 is a graph of the response characteristic of the output of the circuit of FIG. 1 as a function of supply voltage.
Figure 6:
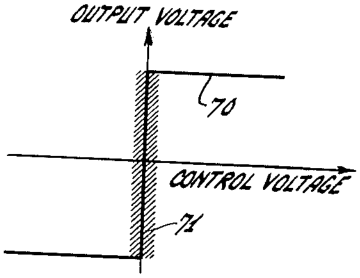
FIGS. 6 and 7 are each a graph of the response characteristic of the output of the circuit of FIG. 1 as a function of control voltage when operated in the regions II and III, respectively, of FIG. 4.

The response characteristics of the output voltage of a parametric circuit as a function of control signal amplitude when operating in region II (the bistable region), is shown by the curve 70 of FIG. 6. The upper portion of the curve 70 represents one phase of output signals, and the lower portion of the curve 70 represents the other phase output signals. In FIG. 6, it is assumed that a supply voltage of sufficient amplitude, say S1 of FIG. 4, is applied at the time $t1$ of FIG. 5. As shown by the curve 70, the circuit exhibits a relatively narrow region 71 of uncertainty with respect to phase of the oscillations. Thus, in the absence of previously applied control signals, the phase in which the oscillations will occur is unpredictable. It is because of this phase uncertainty that the prior art parametric devices apply the control signal prior to the supply signal. Logical gating operations are performed in the prior art devices by linear addition of the control signals (a Kirchhoff law addition) before the supply voltage is applied to the circuit.

Figure 7:
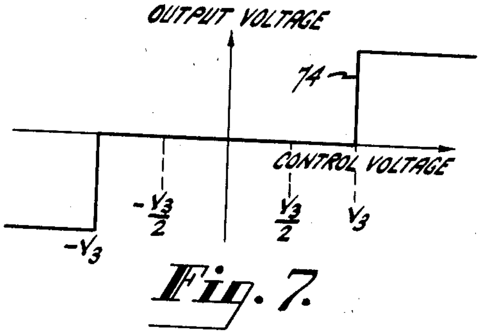

The curve 74 of FIG. 7 represents the response characteristic of the parametric circuit of FIG. 1 as a function of control signal amplitude when the circuit is operated in the tristable region III (FIG. 4). Thus, for a fixed supply voltage of S2 volts (FIG. 4), a relatively large threshold to control signal amplitude (FIG. 7) exists. Control signals in excess of $|V3|$ volts must be applied before the circuit begins oscillation. This relatively large control signal threshold, not found in the bistable region, permits novel logical switching operations. The switching signals do not have to be applied before the supply signals to control the output phase. Thus, a net control signal of amplitude smaller than the critical amplitude $|V3|$ does not produce parametric oscillations, while a net control signal larger than $|V3|$ always produces oscillations in the desired phase.

The switching circuit 80 of FIG. 8 is a ternary logic circuit using a parametric oscillator circuit of FIGS. 1, 2 or 3. Higher speed operation can be obtained with the circuit of FIG. 2 than can be obtained with the circuit of FIG. 3 because the magnetic elements tend to heat-up at the higher frequencies. A pair of three-value control signals "C" and "D" are used to control the output of the gating circuit 80. The absence of a control signal C or D corresponds to a ternary "0"; the presence of a control signal in the "A" phase corresponds to a ternary "1"; and the presence of a control signal in the "B" phase corresponds to a ternary "2" signal. When present, the C and D control signals are of amplitude $V_3$ (FIG. 7). The output function generated by the ternary circuit of FIG. 8 is given in map form in the table of FIG. 9. For ease of illustration, the table of FIG. 9 designates the ternary "1" A signal by numerical value $-1$, and the ternary "2" B signal by a $+1$, and the ternary "0" signal by a "0." Each of the other tables referred to hereinafter uses a similar designation. The nine ($3^n$) possible outputs generated by the nine possible combinations of the C and D control signals of the gating circuit 80 are shown in FIG. 9.

The gating circuit 82 of FIG. 10 corresponds to a ternary coincidence circuit in which both the ternary control inputs C and D are each restricted to an amplitude $$\pm\frac{V3}{2}$$

(FIG. 7.) Thus, both "C" and "D" inputs of the same ternary value must be present at the same time before an output signal is produced. The table of FIG. 11 expresses the nine ($3^n$) possible outputs produced for all the nine possible combinations of C and D control signals.

Other output functions may be obtained by using an additional bias input signal of one phase and of a given amplitude. For example, the circuit 84 of FIG. 12 uses a full amplitude bias signal in the "B" phase in conjunction with full amplitude "C" and "D" control signals to generate the output function shown in the table of FIG. 13.

The switching circuit of FIG. 14 uses a "half-amplitude" bias signal in the "B" phase in conjunction with "half-amplitude" "C" and "D" control signals to generate the output function shown in the table of FIG. 15. Any of the output functions may be inverted by using a transformer to take the output signals from the switching circuit. In such case, the signs of the "1" signals in each of the squares of the tables are reversed from that shown in the drawing.

Figure 16:
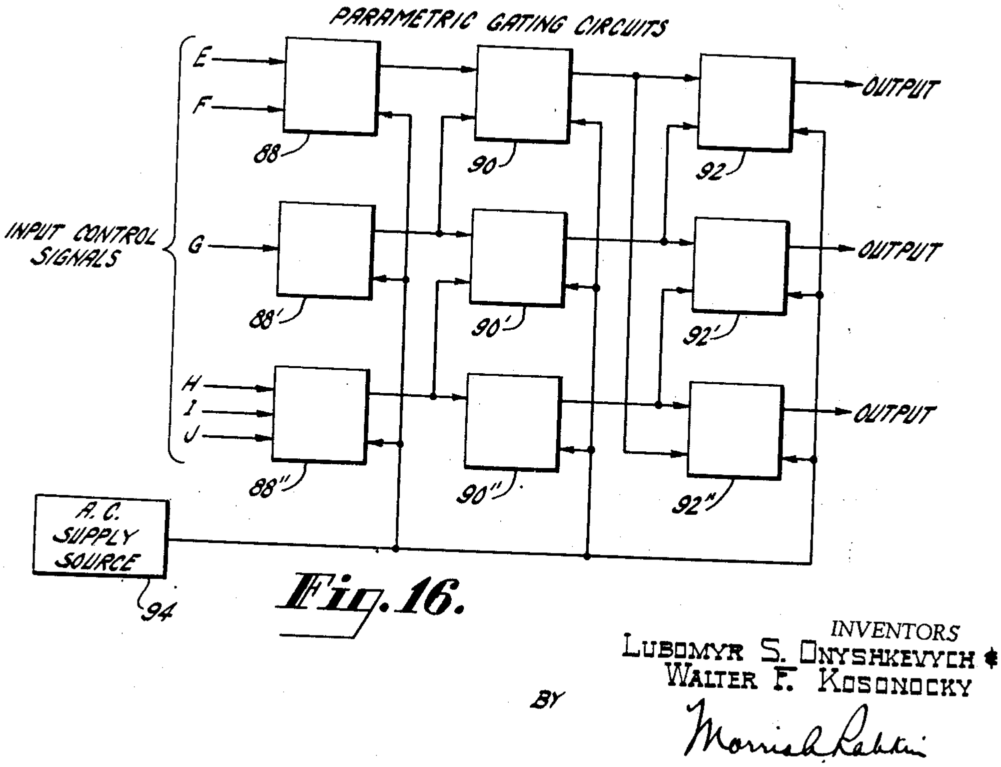

The parametric gating circuits according to the invention also may be operated in a manner to provide directivity to the flow of information signals through a plurality of cascaded parametric logic circuits. The prior parametric circuits obtained directivity of information flow by using a plurality of separate A.C. supply sources and modulating these separate supply sources in a given fashion. In FIG. 16, a plurality of parametric switching circuits 12 are interconnected in three levels for performing various logical operations on separate control input signals "E" through "J." The system of FIG. 16 is shown as a generalized system because the particular logic functions performed by the system would vary depending upon the use of the system in a particular switching network. A single A.C. supply source 94 is coupled to each of the switching circuits. The supply signals from the source 94 have an amplitude of S2 (FIG. 4) volts such that each of the switching circuits is normally not oscillating.

The first level switching circuits 88 are controlled by the input control signals "E" through "J." The output functions of the first switching circuits can be any logical function such as that expressed in the tables of FIGS. 9, 11, 13, or 15. The outputs of the first level switching circuits 88 control the second level of switching circuits 90. Again the functions generated by any of the second level switching circuits 90 can be set to generate various output functions. The output signals of the second level of switching circuits 90 control the third level of switching circuits 92 in similar fashion to provide the final output signals.

In operation, all the logic functions of the interconnected switching circuits are performed without interrupting or modulation of the A.C. supply. Also, the directivity of information flow is assured since (1) each of the switching circuits operates as a separate coincidence circuit, and (2) the signals appearing on an input line of one switching circuit due to the oscillation of that one circuit are of insufficient amplitude to change the state of any preceding switching circuit.

There have been described herein improved multistate switching circuits using parametric oscillators. These circuits provide a relatively large threshold for coincident type operations, and provide distinct output signals for each of the separate states. The circuits may be interconnected in various fashions in switching systems to provide complex switching functions using a common A.C. supply source.

What is claimed is:

1. A switching system comprising a parametric oscillator circuit, said circuit having an operating region in which A.C. supply signals are insufficient in amplitude to cause oscillations, and in which control signals above a given amplitude cause circuit oscillations jointly with said A.C. signals, the phase of said circuit oscillations being controlled by said control signals, and means for applying said control signals selectively to said circuit to initiate desired oscillations.

2. A ternary logic circuit comprising a parametric oscillator circuit having an operating region in which the circuit oscillations are jointly controlled by the A.C. supply and by a control signal above a minimum amplitude, and means to apply said control signal to said oscillator circuit, the ternary values of said logic circuit corresponding respectively to the absence of oscillations, to oscillations in one phase, and to oscillations in a phase different from the one phase.

3. A switching system comprising a parametric oscillator circuit, said circuit having a hysteresis region over a given range of A.C. supply voltage in which the circuit exhibits a relatively large threshold to oscillation initiating control signals, and in which the circuit remains oscillating after the removal of said control signals, means for applying A.C. signals within said range to said circuit, and means for applying selectively two or more control signals to said circuit, said control signals when applied initiating oscillations only when said threshold is exceeded.

4. A switching system comprising a parametric oscillator circuit responding to an A.C. signal having a selected operating frequency differently in accordance with the difference in a characteristic of said A.C. signal, said characteristic being one of frequency and amplitude, said circuit being non-oscillating in a first region of said characteristic, being oscillating in a second region of said characteristic, and, in a third region of said characteristic, between said other two, the said circuit remaining oscillating if it is oscillating and remaining non-oscillating if it is non-oscillating, means to apply said A.C. signals with a characteristic limited to said third region, and means for applying a control signal to said circuit to initiate oscillations.

5. A switching system comprising a parametric oscillator circuit, said circuit having a hysteresis region over a given range of A.C. supply signals in which the circuit exhibits a relatively large threshold to oscillation initiating control signals, and in which the circuit remains oscillating after the removal of said control signals, means for applying A.C. signals within said range to said circuit, means for applying to said circuit a bias control signal having an amplitude at least equal to said threshold and of one phase, and means for applying to said circuit a plurality of control signals each having an amplitude equal to that of said bias control signal and each of said control signals being of either said one phase or of the opposite phase, said control signals when applied initiating oscillations in said opposite phase when both said control signals are present in the opposite phase and said control signals when present initiating oscillations in said one phase when at least one of said control signals is present in said one phase.

6. A switching system comprising a parametric oscillator circuit, said circuit having a hysteresis region over a given range of A.C. supply signals in which the circuit exhibits a relatively large threshold to oscillation initiating control signals, and in which the circuit remains oscillating after the removal of said control signals, means for applying A.C. signals within said range to said circuit, means for applying to said circuit a bias control signal having an amplitude less than said threshold value and of one phase, and means for applying to said circuit a plurality of other control signals each having an amplitude less than said threshold value and each being of either said one phase or of the phase opposite the said one phase, said other control signals initiating oscilations when and only when the net control signal applied to said circuit is in excess of said threshold value.

7. A switching system comprising first and second parametric oscillator circuits, each of said circuits having a hysteresis region over a given range of A.C. supply signals in which region the circuit exhibits a relatively large threshold to oscillation initiating control signals, and in which region the circuit remains oscillating after the removal of said control signals, said circuits each having an output and an input, means coupling the output of said first circuit to the input of said second circuit, means for applying A.C. signals within said range to both said first and second circuits, means for applying selectively two or more control signals to said first circuit, said control signals when applied initiating oscillations in said first circuit when and only when said first circuit threshold is exceeded, and means for applying to said second circuit a further control signal, said further control signal with said first circuit output jointly initiating oscillations in said second circuit when and only when said second cicuit threshold is exceeded.

8. A switching system comprising a plurality of groups of parametric oscillator circuits, each of said circuits having a plurality of control inputs and an output, means interconnecting said groups of circuits in multi-level logical grouping by connecting the respective outputs of a first of said groups to the inputs of one or more of said circuits of a second of said groups and so on, an A.C. supply source for applying A.C. supply signals to all said oscillator circuits, said A.C. supply signals being of an amplitude insufficient to produce circuit oscillations, and means to apply selectively to the said circuits of said first group a plurality of control signals, said control signals when applied jointly with said A.C. signals causing said first group of logic circuits to oscillate in phases determined by the phases of said applied control signals, said second group of logic circuits oscillating in a phase determined by the phase of the control signals applied from said outputs of said first group of logical circuits, and so on.

9. A switching system comprising a plurality of parametric oscillator circuits arranged in a switching system, means for applying at the same time A.C. supply signals to each of said oscillator circuits of an amplitude insufficient to produce circuit oscillations, and means to apply selectively at least first and second control signals to each of said oscillator circuits, said first and second control signals when applied jointly with said A.C. signals, causing said circuit receiving the said control signals to oscillate when both said first and second control signals are in the same one phase, and said control signals not causing said circuit receiving said control signals to oscillate when said control signals are applied in mutually opposite phases.

References Cited in the file of this patent

UNITED STATES PATENTS

| | | |
|---|---|---|
| 2,815,488 | Von Neumann | Dec. 3, 1957 |
| 2,838,687 | Clary | June 10, 1958 |

FOREIGN PATENTS

| | | |
|---|---|---|
| 778,883 | Great Britain | July 10, 1957 |

OTHER REFERENCES

"Elementary Principle of Parametron" for Datamation, vol. 4, No. 5, Sept.-Oct. 1958, pages 31–34.